US010552667B1

(12) United States Patent
Bogan, III et al.

(10) Patent No.: US 10,552,667 B1
(45) Date of Patent: Feb. 4, 2020

(54) METHODS AND SYSTEMS FOR IMAGE PROCESSING

(71) Applicant: Neon Evolution Inc., Los Angeles, CA (US)

(72) Inventors: Carl Davis Bogan, III, Los Angeles, CA (US); Kenneth Michael Lande, Los Angeles, CA (US); Jacob Myles Laser, Los Angeles, CA (US); Brian Sung Lee, Los Angeles, CA (US)

(73) Assignee: Neon Evolution Inc., Los Angeles, CA (US)

( * ) Notice: Subject to any disclaimer, the term of this patent is extended or adjusted under 35 U.S.C. 154(b) by 0 days.

(21) Appl. No.: 16/544,673

(22) Filed: Aug. 19, 2019

(51) Int. Cl.
| | |
|---|---|
| *G06K 9/00* | (2006.01) |
| *G06T 15/20* | (2011.01) |
| *G06T 13/40* | (2011.01) |
| *G06T 11/60* | (2006.01) |

(52) U.S. Cl.
CPC ..... *G06K 9/00281* (2013.01); *G06K 9/00228* (2013.01); *G06K 9/00288* (2013.01); *G06T 11/60* (2013.01); *G06T 13/40* (2013.01); *G06T 15/205* (2013.01); *G06T 2207/30201* (2013.01)

(58) Field of Classification Search
CPC .......... G06K 9/00221; G06K 9/00268; G06K 9/00302; G06T 13/40
USPC ................ 382/115, 117, 118, 128, 209, 278; 128/922, 923
See application file for complete search history.

(56) References Cited

U.S. PATENT DOCUMENTS

| | | | | |
|---|---|---|---|---|
| 7,446,799 | B2 * | 11/2008 | Suzuki | H04N 1/00129 348/207.2 |
| 7,627,370 | B2 * | 12/2009 | Marks | A61B 5/16 600/544 |
| 8,345,114 | B2 * | 1/2013 | Ciuc | G06K 9/00221 348/222.1 |

(Continued)

OTHER PUBLICATIONS

Youtube video: "I used 'deep fakes' to fix the Lion King," Aug. 8, 2019, https://www.youtube.com/watch?v=Y1HGglCqZ3c&feature=youtu.be.

(Continued)

*Primary Examiner* — Yosef Kassa
(74) *Attorney, Agent, or Firm* — Knobbe, Martens, Olson & Bear LLP

(57) ABSTRACT

Systems and methods are disclosed configured to pre-train an autoencoder using images that include faces, wherein the autoencoder comprises an input layer, an encoder configured to output a latent image from a corresponding input image, and a decoder configured to attempt to reconstruct the input image from the latent image. An image sequence of a CGI sculpted and textured face exhibiting a plurality of facial expressions and transitions between facial expressions is accessed. Images of the plurality of facial expressions and transitions between facial expressions are captured from a plurality of different angles. The pre-trained autoencoder is trained using source images that include a CGI face with different facial expressions captured at different angles, and using destination images that include a real face. The trained autoencoder is used to generate an output where the real face in the destination images is swapped with the CGI face, while preserving expressions of the real face.

25 Claims, 10 Drawing Sheets

(56) References Cited

U.S. PATENT DOCUMENTS

| | | | |
|---|---|---|---|
| 8,498,456 B2* | 7/2013 | Legagneur | A45D 44/005 |
| | | | 382/118 |
| 8,553,037 B2* | 10/2013 | Smith | G06T 13/40 |
| | | | 345/473 |
| 9,444,434 B1* | 9/2016 | Tanase | H03F 3/45071 |
| 2009/0310828 A1 | 12/2009 | Kakadiaris et al. | |
| 2011/0123118 A1 | 5/2011 | Nayar et al. | |
| 2013/0336600 A1 | 12/2013 | Bitouk et al. | |
| 2014/0204084 A1 | 7/2014 | Corazza et al. | |
| 2017/0004397 A1 | 1/2017 | Yumer et al. | |
| 2019/0005305 A1 | 1/2019 | Huang | |
| 2019/0206101 A1 | 7/2019 | De la Torre et al. | |

OTHER PUBLICATIONS

Güera, et al., "Deepfake Video Detection Using Recurrent Neural Networks," Video and Image Processing Laboratory (VIPER), Purdue University, 6 pages, Nov. 2018 https://engineering.purdue.edu/~dgueraco/content/deepfake.pdf.

* cited by examiner

METHODS AND SYSTEMS FOR IMAGE PROCESSING

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

This document relates to systems and techniques for digital image processing.

Description of the Related Art

Conventional techniques for processing computer generated videos may require large amounts of computer resources, take an inordinate amount of time. Hence, more computer resource-efficient and time-efficient techniques are needed to perform advanced forms of digital image processing, such as face-swapping.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure relate systems and methods configured to train an autoencoder using images that include faces, wherein the autoencoder comprises an input layer, an encoder configured to output a latent image from a corresponding input image, and a decoder configured to attempt to reconstruct the input image from the latent image. An image sequence of a CGI sculpted and textured face exhibiting a plurality of facial expressions and transitions between facial expressions is accessed. Images of the plurality of facial expressions and transitions between facial expressions are captured from a plurality of different angles. The autoencoder is trained using source images that include a CGI face with different facial expressions captured at different angles, and using destination images that include a real face (e.g., a photograph or video of a person's face). The trained autoencoder is used to generate an output where the real face in the destination images is swapped with the CGI face, while preserving expressions of the real face.

An aspect of the present disclosure relates to an electronic image processing system, comprising: a network interface; at least one computing device; computer readable memory including instructions operable to be executed by the at least one computing device to perform a set of actions, configuring the at least one computing device: provide computer graphics animation resources configured to enable a user to generate computer graphic imagery (CGI) faces by: sculpting at least a face; adding texture to the face; animating the face to exhibit a plurality of facial expressions and transitions between facial expressions; use one or more virtual cameras to capture images of the plurality of facial expressions and transitions between facial expressions from a plurality of different angles; pre-train an autoencoder using images that include faces, wherein the autoencoder comprises: an input layer; an encoder including at least one hidden layer that has fewer nodes than the input layer to thereby constrain recreation of an input image by the encoder, wherein the encoder is configured to output a latent image from a corresponding input image; a decoder configured to attempt to reconstruct the input image from the latent image; train the pre-trained autoencoder using source images that include a first CGI face with different facial expressions captured at different angles, and using destination images that include a first real face; and use the trained autoencoder to generate an output using destination images as an input where the first real face in the destination images is swapped with the first CGI face, while preserving expressions of the first real face.

An aspect of the present disclosure relates to a system, comprising: a network interface; at least one computing device; computer readable memory including instructions operable to be executed by the at least one computing device to perform a set of actions, configuring the at least one computing device: access a source data set comprising an image sequence of a first computer graphic imagery (CGI) sculpted and textured face exhibiting a plurality of facial expressions and transitions between facial expressions; capture images of the plurality of facial expressions and transitions between facial expressions from a plurality of different angles; train an autoencoder using: source images that include the first CGI face with different facial expressions captured at different angles, and destination images that include a first real face, wherein the autoencoder comprises: an input layer; an encoder including at least one hidden layer that has fewer nodes than the input layer to thereby constrain recreation of an input image by the encoder, wherein the encoder is configured to output a latent image from a corresponding input image; a decoder configured to attempt to reconstruct the input image from the latent image; and use the trained autoencoder to generate an output where the first real face in the destination images is swapped with the first CGI face, while preserving expressions of the first real face.

An aspect of the present disclosure relates to a computer implemented method comprising: under control of a hardware computing device configured with specific computer executable instructions: accessing a source data set comprising an image sequence of a first computer graphic imagery (CGI) sculpted and textured face exhibiting a plurality of facial expressions and transitions between facial expressions; capturing images of the plurality of facial expressions and transitions between facial expressions of the first CGI face from a plurality of different angles; training an autoencoder using: source images that include the first CGI face with different facial expressions captured at different angles, and destination images that include a first real face, wherein the autoencoder comprises: an input layer; an encoder including at least one hidden layer that has fewer nodes than the input layer, wherein the encoder is configured to output a latent image from a corresponding input image; a decoder configured to attempt to reconstruct the input image from the latent image; and using the trained autoencoder to generate an output using the destination images, where the first real face in the destination images is swapped with the first CGI face, while preserving expressions of the first real face.

BRIEF DESCRIPTION OF THE DRAWINGS

Embodiments will now be described with reference to the drawings summarized below. These drawings and the asso

FIG. 3, 3A-3B illustrates an example autoencoder architecture.

DETAILED DESCRIPTION

As discussed above, conventional techniques for processing computer generated videos require large amounts of computer resources and take an inordinate amount of time. Further, certain relatively new applications for digital image processing, such as face-swapping, are becoming ever more popular, creating further demand for computer resources.

Conventionally, face-swapping is performed by capturing an image or a video of a person (sometimes referred to as the source) whose face is to be used to replace a face of another person in a destination video. For example, a face region in the source image and target image may be recognized, and the face region from the source may be used to replace the face region in the destination, and an output image/video is generated. The source face in the output preserves the expressions of the face in the original destination image/video (e.g., has lip motions, eye motions, eyelid motions, eyebrow motions, nostril flaring, etc.). If insufficient computer resources and/or time are made available to perform the face swapping the output may fail on one or more looks or movements. Further, conventional techniques lack the capability to generate output content in high resolution (HD (about 1920×1080 pixels, 1280×720 pixels, or 1366×768 pixels), 4K UHD (about 3840×2160 pixels), 4K (about 4096×2160 pixels), or 8k (about 7680×4320)), instead certain conventional techniques are limited to generating output content limited to a resolution of 256 pixels.

To overcome one or more of the foregoing technical drawbacks of conventional techniques and systems, disclosed herein are systems and methods for performing face swapping in a more computer-resource and time efficient manner, while providing a more realistic and higher resolution output. It is understood that although reference may be made wherein to face swapping for illustrative purposes, the disclosed systems and methods may be used to swap other items instead of or in addition to human faces, such as hair, clothing, limbs, digits, bodies, animal faces, non-humanoid or imaginary characters, and/or objects.

As similarly discussed above, conventional techniques for face swapping involve swapping the face of a real person from one image/video to replace the face of another real person in another image/video. By contrast, in order to reduce the needed computer and time resources, and to provide a higher resolution, more realistic output, certain techniques are disclosed that use a computer-generated image (rather than photographs or videos of a real face) to replace the face of a real person in a destination image/video in generating an output image/video. Although certain examples may refer to source, destination, and output videos, it is understood that certain techniques described herein may be also applied to single source, destination, and output images.

Figure 1:
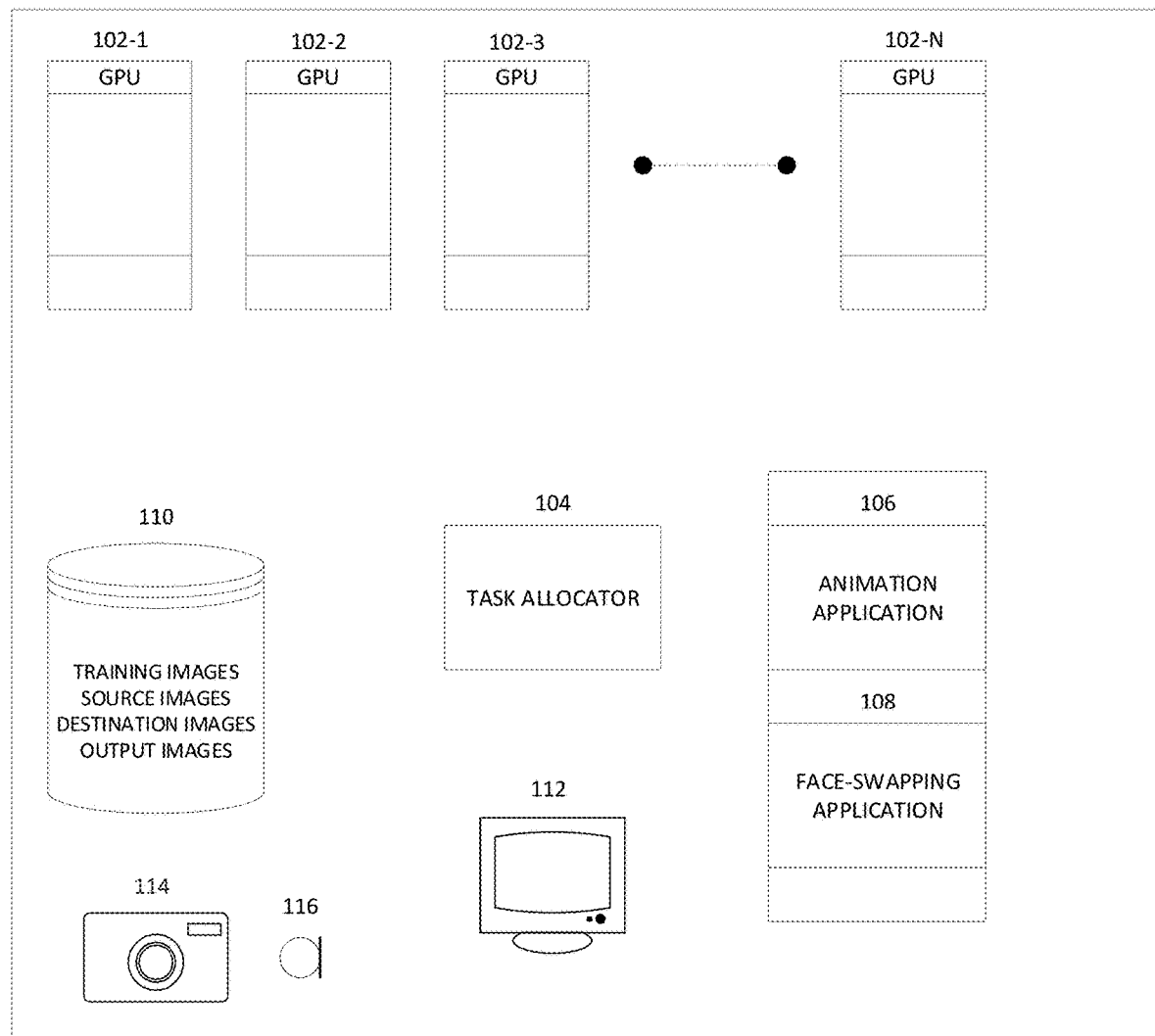
- FIG. 1 illustrates an example architecture.

Referring to FIG. 1, an example architecture of an image processing system 100 is illustrated. The image processing system 100 may be used to generate an output video, wherein a face is swapped from a face region in a source video to a face region in a destination video. An image processing system may include memory (e.g., non-volatile memory, such as semiconductor EEPROM, magnetic memory, optical memory, etc.) that stores an animation application 106 and a face-swapping application 108. In addition, one or more operating systems, application programming interfaces, browsers, and/or other applications may be stored in memory.

A data store 110 may include relational databases and/or flat file systems that store digital content. For example, the data store 110 may include training sets (e.g., 2D and/or 3D images/videos that include human faces) to pre-train the face-swapping application 108 (as discussed in greater detail elsewhere herein), source data sets (e.g., 2D and/or 3D images/videos that include animations of human faces generated using the animation application), destination data sets (e.g., 2D and/or 3D destination images/videos that include human faces), and output data sets (images/videos generated by the face-swapping application 108).

Optionally, in addition to or instead of storing purely animated source images (generated without the use of motion capture of a human), the data store 110 may store source animations images generated using a facial motion capture helmet and facial animation software. The facial motion capture helmet may be configured with one or more cameras. For example, the facial capture helmet may include several high-resolution, high-speed cameras on arms configured to capture facial expressions and nuances of the person wearing the helmet (where the cameras are positionable to capture different angles of the person's face) which may then be used as the basis for an animated face. The facial capture helmet may include on-board lighting configured to illuminate the face of the person wearing the helmet.

One or more cameras 114 may be used to capture still or video images which may be used as face swapping engine training images and/or as destination images. The cameras 114 may include spherical cameras (e.g., cameras that capture about a 360 field of view). The cameras 114 may be of a desired resolution (e.g., resolution sufficient to generate HD, 4K UHD, 4K, 8K, or 16K videos). One or more microphones 116 may be provided to record audio content (e.g., the speech of the person whose face is being recorded) in synchronization with the image/video content. For example, the audio content may be stored in the data store 110 as part of (a track of) a destination video. Optionally, two microphones may be provided to enable stereo recording.

The image processing (including the face swapping processes described herein) may be performed using one or more processing units, such as one or more graphics processing units (GPUs) 102-1 . . . 102-N. A given GPU may include hundreds or thousands of core processors configured to process tasks and threads in parallel. A GPU may include high speed memory dedicated for graphics processing tasks. A GPU may be configured to render frames at high frame rates. A GPU may be configured to render 2-D and/or 3-D graphics, perform texture mapping, and render polygons at high speed.

A task allocator 104 may determine to which and to how many GPUs to allocate graphics tasks from the animation application 106 and/or the face swapping application 108. The task allocator 104 may include or access one or more Central Processing Units (CPUs) that executes task allocation instructions, operating instructions, and/or other instructions. The task allocator 104 may designate which and to how many GPUs to allocate a given task based on one or more of the following criteria:

- a user instruction provided via a user interface specifying how many GPUs are to be assigned to a task (e.g., a pre-training task, a training task, a swapping task, an animation task, etc.);
- the current utilization and availability of GPUs;
- the individual configurations of the GPUs (where the GPU farm is non-homogenous and certain GPUs have more processing power, functionality and/or memory then other GPUs).

A display 112 may be configured to display content from the data store 110, from the GPUs 102, from the animation application 106, from the face swapping application 108, user interfaces, other data, and/or the like. The display 112 may be any type of display, including an LCD, OLED, plasma, projector, virtual reality, or augmented reality displays. For example, the virtual reality or augmented reality display may be in the form of a headset/goggles that include a display for each eye.

The display 112 may be configured to render two dimensional or three dimensional images. The display 112 may include multiple displays which display the output of different applications, GPUs, and/or different content from the data store 110. Thus, for example, a first display may display source content, a second display may display destination content, and a third display may display output content generated by the face swapping application 108.

As noted above, the animation application 106 may be configured to generate animated faces (and optionally other computer generated imagery) to be used as source images/videos. For example, the animation application may be configured to generate computer generated imagery (CGI), such as a face, by performing the sculpture/modelling of a character face, texturing, lighting, and rigging. The animated object, a face in this example, can be a two-dimension (2D) model or a three-dimensional (3D) model in 3D space.

In particular, the animation application 106 may enable some or all of the following CGI features to be controlled by a user (e.g., an animator) and/or rendered:

- shading (e.g., how the brightness and/or color of a surface, such as a surface of a face, varies with lighting);
- texture-mapping (e.g., applying detail information to surfaces or objects using maps);
- bump-mapping (e.g., simulating small-scale bumpiness on surfaces);
- shadows (e.g., effects of obstructing light);
- reflection;
- transparency or opacity (e.g., the degree and areas of sharp transmissions of light through solid objects, such as a face);
- translucency (e.g., the degree and areas of scattered transmissions of light through solid objects, such as a face);
- indirect illumination (e.g., where an object surface, such as a face, is illuminated by light reflected off other surfaces, rather than directly from a light source);
- depth of field;
- motion blur;
- non-realistic rendering (e.g., making a face appear as a monster).

The animation application 106 may enable still additional features to be controlled by a user (e.g., panning, zooming in, zooming out, change focus, change aperture, and the like) and/or rendered.

The rigging may comprise an internal structure (optionally defined by the animator) as an interface. The rigging may include object components that deform the model of the face or other object. The animation application may provide an interface that enables a user to manipulate the rig to thereby control the deformations of the face or other object. Thus, the rig may be analogized to the functions of the strings of a marionette. The face (or other object) may be associated with properties such as elasticity and translucence.

Figure 2A:
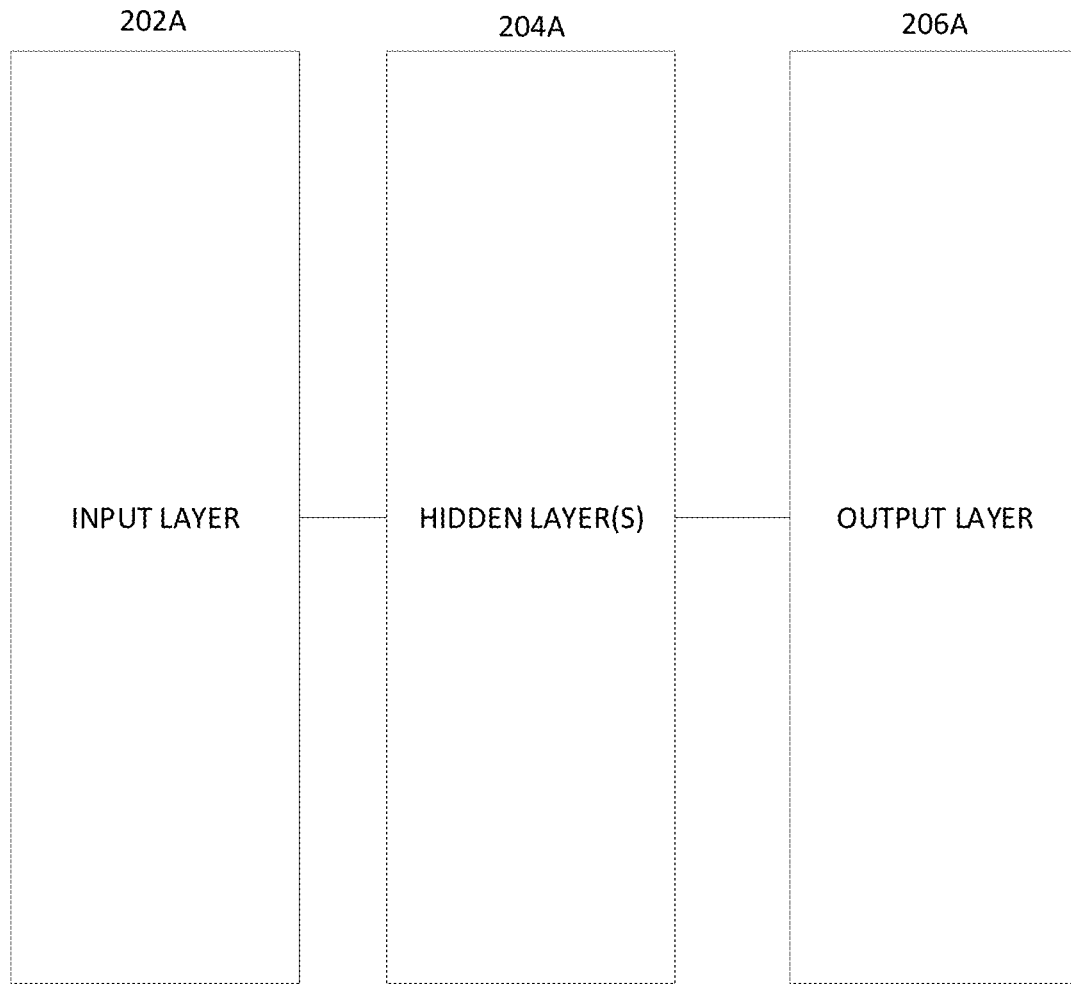
FIG. 2A-2B illustrates an example convolutional neural network architecture.

Artificial intelligence, such as a learning engine, may be used to identify objects, such as faces in image/video content, and/or to perform a face swapping process. For example, the learning engine may include a convolutional neural network (CNN), such as a deep CNN, an example of which is illustrated in FIG. 2A. The CNN may include an input layer 202A, one or more hidden layers 204A, and an output layer 206A. The neural network may be configured as a feed forward network. The neural network may be configured with a shared-weights architecture and with translation invariance characteristics. The hidden layers may be configured as convolutional layers (comprising neurons/nodes), pooling layers, fully connected layers and/or normalization layers. The convolutional deep neural network may be configured with pooling layers that combine outputs of neuron clusters at one layer into a single neuron in the next layer. Max pooling and/or average pooling may be utilized. Max pooling may utilize the maximum value from each of a cluster of neurons at the prior layer. Average pooling may utilize the average value from each of a cluster of neurons at the prior layer.

A specialized type of CNN, which may be referred to as an autoencoder, may be configured to learn efficient data (image) codings in an unsupervised manner. An autoencoder may be utilized to perform the face swapping process. An autoencoder may attempt, with a reduced dimensionality, to replicate input vectors at the output layer with a reduced set of neurons/nodes.

Figure 2B:
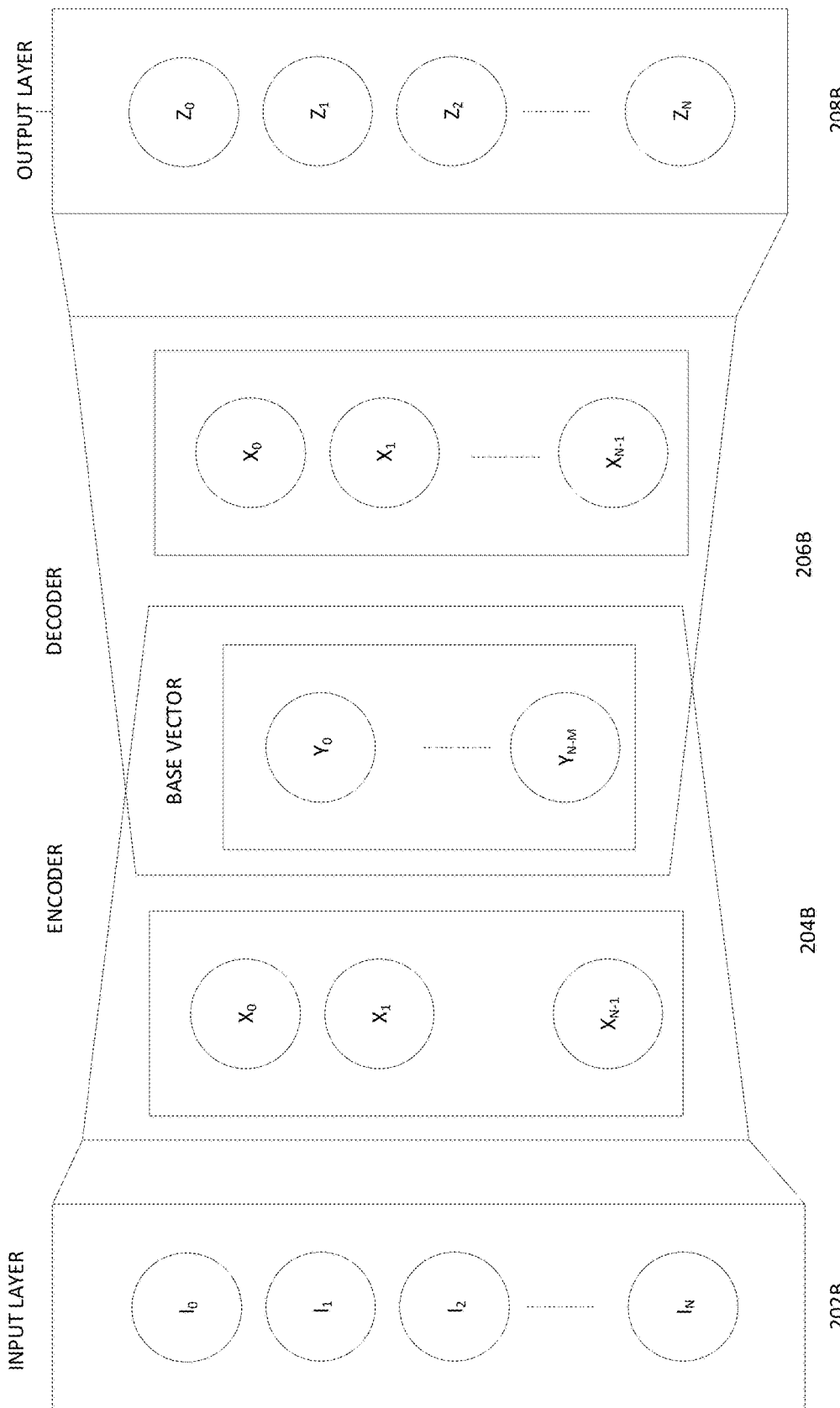

With reference to FIG. 2B, an example autoencoder includes an input layer 202B, an output layer 208B, an encoder 204B, and a decoder 206B. The encoder 204B in this example, maps the input (e.g., an image of a face) to generate a base vector (e.g., a latent image of the face). The decoder 206B maps the base vector (e.g., the latent image of the face) to a reconstruction of the original input (original image of the face). In this example, the output layer 208B has the same number of nodes/neurons as the input layer 202B to enable the input (an image of a face) to be reconstructed by the output, while minimizing the difference (the loss) between the output and the input.

In order to ensure that the autoencoder does not merely map the inputs directly to the outputs, the encoder 204B includes at least one hidden layer that has fewer nodes/neurons than the input layer to thereby constrain the recreation of the input at the encoder output (in the base vector/latent image). As illustrated, the encoder 204b and the decoder 206B share the base vector/latent image.

The encoder 204B and decoder 206B may include only a single hidden layer each or may include multiple hidden layers. Advantageously, the use of multiple hidden layers may result in improved compression. Further, advantageously, the use of multiple hidden layers may greatly reduce the computational resources needed to generate a base vector/latent image by the decoder 206, and to generate an output by the decoder 206B, and may reduce the amount of training data sets needed for training.

A given node edge may be assigned a respective set of weights. Backpropagation may be used to adjust the weights each time the error is calculated to improve the autoencoder performance. Thus, training the autoencoder enables the encoder to represent the input (e.g., the image of a face or other base vector) in a more compact form (a lower dimensional representation of the face), which the decoder than attempts to reconstruct.

As will be described, the encoder 204B and decoder 206B may be trained using destination images with original faces. The encoder 204B (and optionally a different decoder) may also be trained using source faces. After training is performed, a latent face generated by the encoder 204B of the destination/original face may be feed to the decoder that was trained using the source face. The decoder trained using the source face will attempt to reconstruct the destination face, from the information relative to source face, resulting in a face that has the expressions and orientations of the destination face but having the source face.

Figure 3:
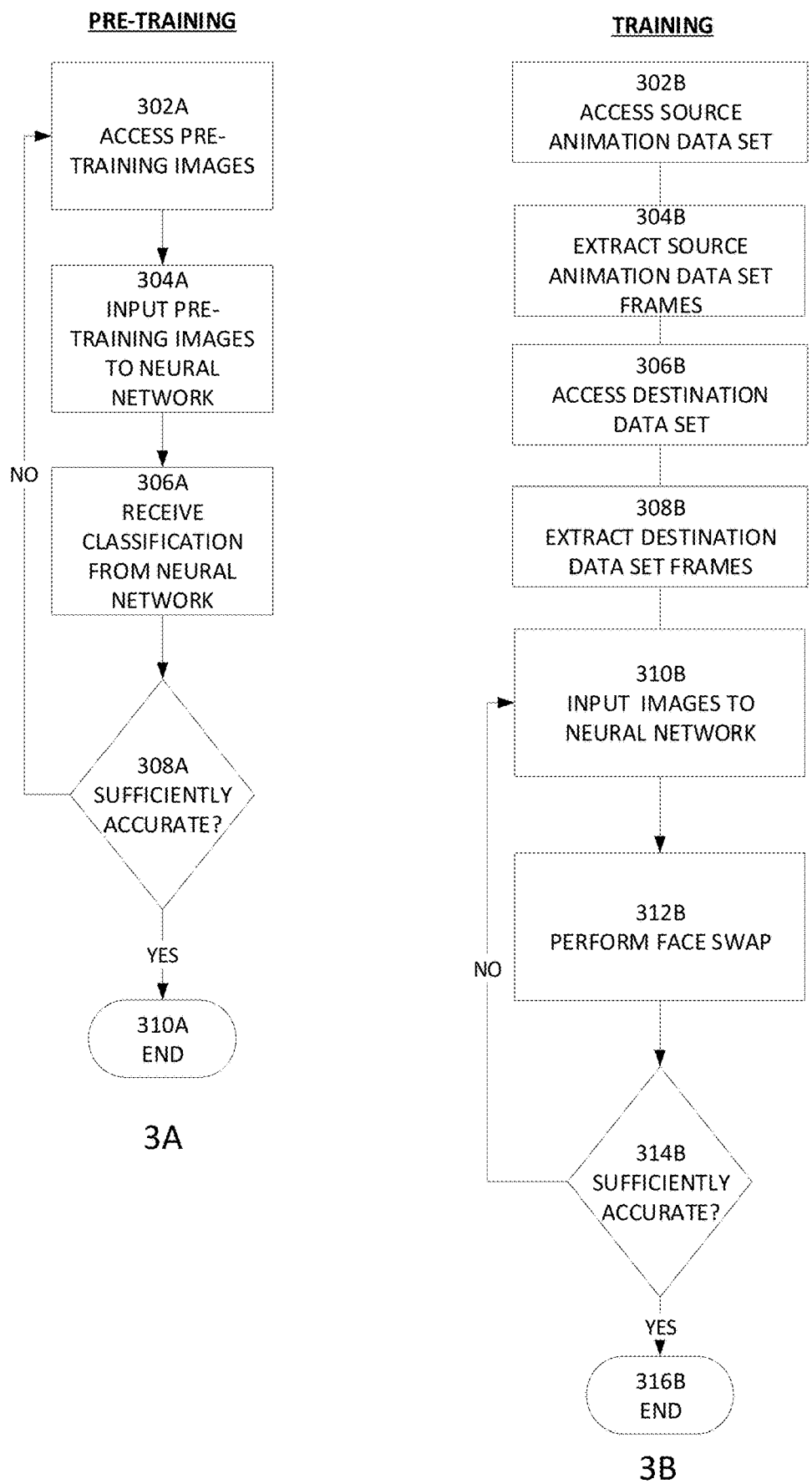

FIG. 3 illustrates an example learning engine (e.g., CNN autoencoder) pre-training process (3A) and an example learning engine (e.g., CNN autoencoder) training process (3B). The pre-training process optionally uses large numbers of images of different faces (e.g., 3,000-10,000 facial images). The pre-training images may be from one or multiple sources. The pre-training process may be utilized to train the learning engine to identify and classify faces in images and/or facial features (e.g., nose, eyes, mouth, etc.). The training process may be utilized to train the learning engine to replicate input vectors at the output layer with a reduced set of neurons/nodes, to thereby train the learning engine to perform face swapping.

At block 302A, pre-training images are accessed from one or more data sources. The data sources may be maintained and hosted by the same entity that maintains and operates the learning engine and/or may be maintained and hosted by other entities. At block 304A, one or more images are provided to the learning engine for pre-training. At block 306A, the learning engine attempts to identify/classify faces and/or features thereof, and the classification outputs are received. For example, the learning engine may be configured to generate a bounding box around what the learning engine has classified as a face. At block 308, the learning engine's classification may be examined (e.g., by a human or another face classification system) and a determination is made as to whether the classification is correct. At block 308A, a statistical analysis may be performed as to the overall classification accuracy of the learning engine for multiple classifications performed on respective images. For example, the average accuracy may be utilized:

Average accuracy=total correct classifications/total classifications

The determined accuracy may be compared to a minimum threshold accuracy. If the determined accuracy is equal to or exceeds the threshold accuracy, the process may end at block 310A. Otherwise, additional pre-training figures may be accessed and additional pre-training performed until the determined accuracy satisfies the accuracy threshold and/or until a certain amount of time has elapsed.

Referring now to FIG. 3B, at block 302B the example training process accesses the source animation data set for a given character. For example, the source animation data set may include animated images (a video) of different expressions (e.g., with different positions and/or movement of the mouth, lips, tongue, facial muscles, eyelids, eyebrows, nostrils, cheeks, forehead, wrinkles, teeth and/or the like), angles, and/or lighting of the face of the CGI character generated using the animation application 106. For example, nostrils may be flared to indicate arousal, lips may be positioned as a grin to indicate happiness, lips may be compressed to indicate anger or frustration, lips may be shaped into a pout to indicate sadness of uncertainty, lips may be pursed to indicate disagreement, a tongue may protrude from lids to indicate focus or disagreement, eyes may be widened to indicate excitement, big pupils may be used indicate arousal or interest, etc.

By way of illustration, the different expressions may include some or all of the following:

Anger (e.g., flared nostrils, eyebrows squeezed together to form a crease, eyelids tight and straight, slightly lowered head, eyes looking upwards through a lowered brow, tightening of facial muscles, tight lips);

Boredom (e.g., half-open eyelids, raised eyebrows, frowning lips, relaxed muscles, vacant gaze, immobile face);

Concentration (e.g., erect or pushed forward head, fixed eyes, reduced blinking, unconscious movement of tongue, slightly raised eyebrows);

Confusion (e.g., forehead and/or nose scrunched up, one eyebrow raised higher than the other, pursed lips);

Contempt (e.g., neutral eyes with one side of the lip turned up and pulled back);

Disgust (e.g., raised upper eyelid and lower lip, wrinkled nose, raised cheeks, flared nostrils, closed mouth);

Excitement (e.g., open-mouthed smile, wide eyes, raised eyebrows);

Fear (e.g., eyebrows raised and drawn together, wrinkled forehead, raised upper eyelid, tensed lower eyelid, whites of the eyes are visible, gaping mouth, tensed lips);

Frustration (e.g., inward slanting eyebrows that are squeezed together, raised chin, lips pressed together, frowning, mouth twisted to one side with a crease on the cheek);

Glare (e.g., tensed eyebrows, squinted eyes, intense gaze.);

Happy (e.g., smiling, teeth exposed or not exposed, raised cheeks, crow's feet or wrinkles near corners of the eyes, crescent shape of eyes);

Revolted (e.g., lips pulled back in a frown, chin lowered, tensed lips, eyebrows tensed and drawn together, wrinkled forehead, head pulled back);

Sad (e.g., inner corners of the eyebrows are drawn in and upwards, frowning of lips, jaw protrusion, pouting of lower lip, eyes cast down);

Seduction (e.g., fixed and intense eyes, biting lips, tilted head, slight smile, one eyebrow raised higher than the other);

Snarl (e.g., tensed eyebrows, squinted eyes, intense gaze, exposed teeth, and lips pulled back);

Surprise (e.g., widened eyes, gaping mouth, raised eyebrows, lowered chin, head held back).

Other example facial expressions may include aggression, arousal, contentment, contemplation, doubt, elation, exasperation, impatience, pleasure, suspicion, terror, wariness, etc.

In addition to capturing expressions of the animated face, transitions between expressions may be captured (e.g., from surprise to happiness to contentment, and so on). Such expression transitions may greatly contribute to the ability to perform high quality, accurate, face swapping. Optionally, several versions of each expression may be captured (e.g., captured from different angles and/or with illumination from different angles and/or with different intensities).

Figure 8:
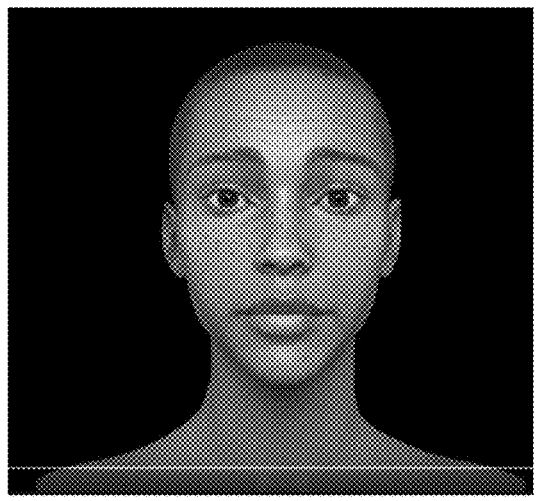
FIG. 8 illustrates an example CGI face presenting different expressions.
Figure 8:
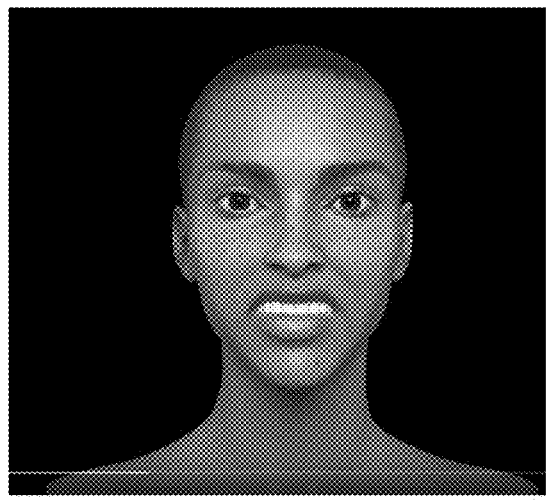
Figure 8:
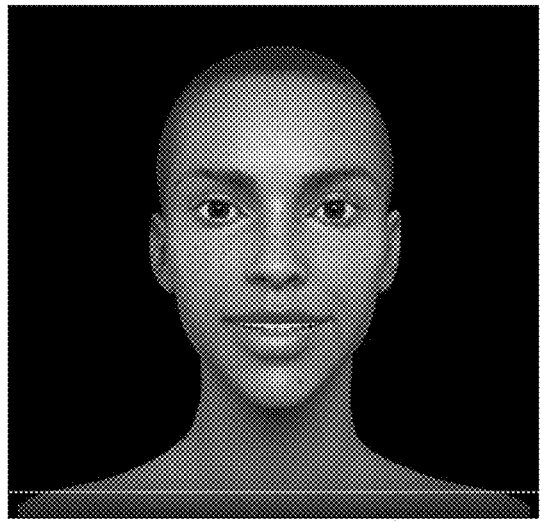
Figure 8:
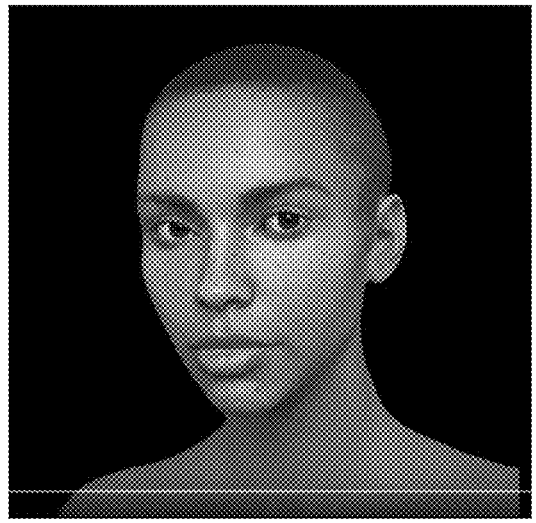
Figure 8:
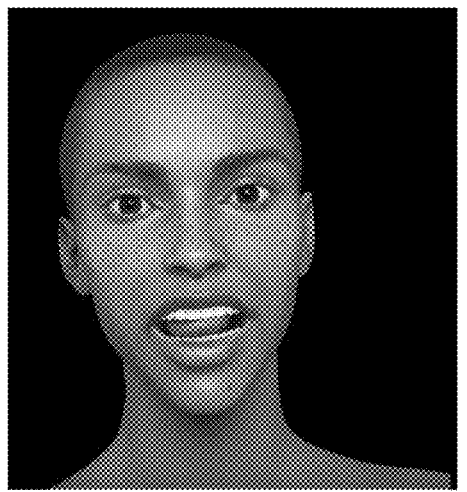
Figure 8:
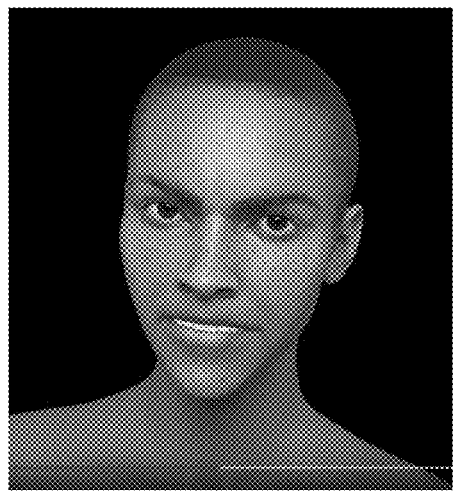

FIG. 8 illustrates example expressions on a CGI generated face.

At block 304B, frames are extracted from the source data set video. The faces in the source frames may be located and aligned (e.g., to remove any rotation relative to the frame base) to facilitate the face swapping operation At block 306B, the destination data set is accessed. The destination data set may comprise a video including a real, non-CGI character whose face is to be replaced with the CGI face from the source data set. By way of example, the non-CGI character may be engaged in acting a part in a movie, video game, video podcast, music video, or the like. Optionally, the non-CGI character may be speaking or singing in the recording. Advantageously, the destination video may be captured at high resolution and at a high frame rate (e.g., 60-120 frames per second (fps) to provide smoother action), although lower frame rates (e.g., 24 or 30 fps) may be used. At block 308B, frames are extracted from the destination data set video. The faces in the destination frames may be located and aligned (e.g., to remove any rotation relative to the frame base) to facilitate the face swapping operation.

At block 310B, at least a portion of the extracted source and destination frames (with the faces aligned) are provided to the learning engine (e.g., a CNN autoencoder). Optionally the same encoder may be trained using both the extracted source frames and the extracted destination frames, but a first decoder may be trained using the latent images generated by the encoder from extracted destination frames, and a second decoder may be trained using the latent images generated by the encoder from extracted source frames. At block 312B, the autoencoder comprising the encoder and the first decoder is used to swap the CGI animated face from the source data set with the face in the destination data set.

At block 314B, a determination is made as to whether the swapping operation is sufficiently accurate and consistent. For example, the consistency of the face swapping operation may be evaluated by measuring the squared Euclidean distance of two feature vectors for an input and a face-swapped result. The determination as to whether the swapping operation is sufficiently accurate may be made by determining whether the squared Euclidean distance of two feature vectors is less than a first threshold. If the determination indicates that the face swapping is sufficiently accurate (or if the training tie has exceeded a time threshold), at block 316B the training may be halted. If the determination indicates that the face swapping is not sufficiently accurate, additional source and/or destinations facial images may be provided to the autoencoder at block 310B and the training may continue. A user interface may be provided that enables the user to name and/or associate tags with the trained autoencoder (sometimes referred to as a model). Such naming and tagging abilities facility later identification and searching for a desired model.

Figure 4:
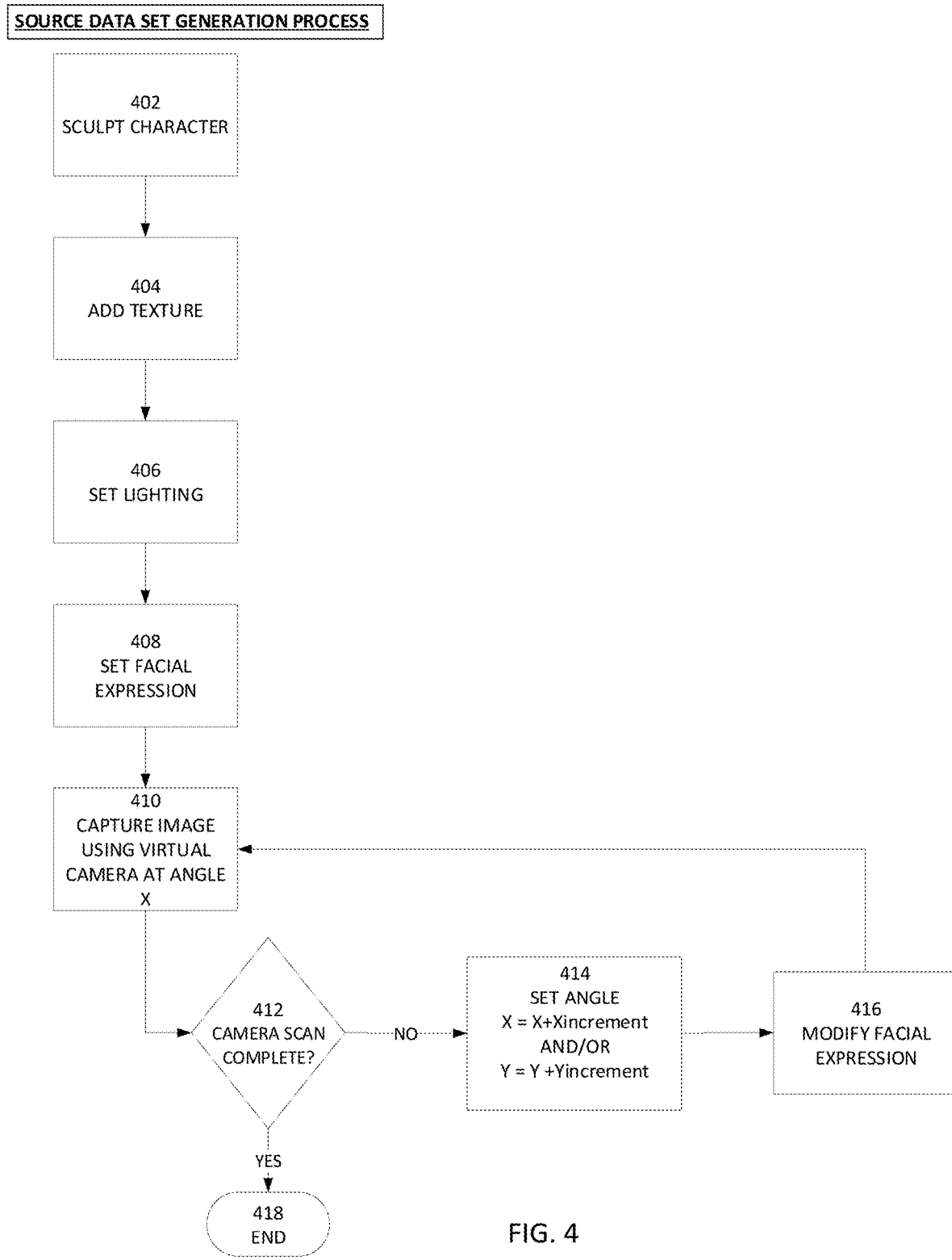
FIG. 4 illustrates an example process for generating a source data set.

FIG. 4 illustrates an example process for generating a source data set (e.g., an animated CGI face). A block 402, the character face is sculpted (e.g., using an animation application) by an animator to create a 3D model. Optionally, the character face may be configured to be rendered on volumetric basis (where a 3D model/data set is projected to 2D, approximating the integration of light rays cast into the volume). At block 404, texture may be added to the sculpted face. For example, bumps, wrinkles, a subdermal layer, a specular highlight map, translucency, and/or the like may be added to create a realistic skin.

At block 406, illumination may be specified. For example, direct illumination and/or indirect/global illumination may be specified. By way of further example, sunlight, fluorescent light, incandescent light, overcast, darkness may be specified. Optionally, the resultant source data set may be tagged with the specified illumination factors. At block 408, a facial expression or transition between facial expressions may be specified. Example facial expressions are described elsewhere herein (anger, aggression, boredom, concentration, contentment, confusion, contemplation, contempt, disgust, doubt, elation, exasperation, excitement, fear, frustration, glare, happy, impatience, pleasure, terror, wariness, sad, seduction, snarl, surprise, suspicion, terror, wariness, etc.).

At block 410, one or more virtual cameras are used to capture an image of the animated face with the specified expression at a first angle. A virtual camera may be in the form of software that works and may behave in a similar manner to an optical camera or digital camera would in the physical world. The virtual camera software, when executed, performs calculations to determine how the CGI object will be rendered based on the location and angle of the virtual camera. The virtual camera may be configured to perform such virtual camera functions as panning, zooming in, zooming out, change focus, change aperture, and the like. Optionally, the texture may be added after the virtual camera captures the image of the CGI face rather than before the virtual camera captures the image of the CGI face. In addition, a virtual light detector (e.g., a virtual integrating sphere) may be used to measure the direction and angle of light reaching the virtual camera.

At block 412, a determination is made as to whether the image capture scan of the animated face is complete. For example, the scan may have been set up to scan +/−60 degrees vertically and +/−90 horizontally relative to the center of the CGI face.

If the scan has been determined to be completed, the scan process is completed at block 418. Optionally, the scan process may be repeated with a different level, angle, and/or type of illumination.

If the scan has not been completed, the process proceeds to block 414. At block 414, (assuming the scan began a the maximum negative angle), the horizontal angle X is incremented by X increment degrees (e.g., 0.1, 0.5, 1, or 2 degrees) and/or the vertical angle Y is incremented by Y increment degrees (e.g., 0.1, 0.5, 1, or 2 degrees). Optionally, rather than changing the camera angle, the camera's position may be held constant and the face may be accordingly rotated in view of the virtual camera.

At block 416, the facial expression may be changed (e.g., to a next facial expression in a list of character facial expressions), and the process may proceed to block 410. The virtual camera may capture an image of the CGI face with the new expression. The resultant source data set may be tagged and/or named to indicate the illumination used. The animator may be provided with a user interface via which the source data set may be specified as well as one or more tags. The source data set may then later be located using a search engine, where the search engine will search for and locate source data sets whose name, tags, creation dates, and/or last edit dates match user-specified search criteria provided via a search user interface. The search results may then be presented to the user via one or more displays.

Optionally, once the source data set is completed, the resulting source video of the facial expressions (and transitions between the facial expressions) may be viewed. The display may be a virtual reality or augmented reality headset that enables the viewer to pause the source video and walk or navigate around the CGI face to view the face from any angle. The source video may be generated in high resolution (e.g., HD, 4K UHD, 4K, 8K, or 16K).

As noted above, one or more virtual cameras may be used to capture images of the CGI face. A tradeoff may be made as to how fast the image capture process is to be performed versus how much data needs to be processed. For example, 36 virtual cameras may be used, 6 virtual cameras may be used, or 1 virtual camera may be used, where the fewer the number of virtual cameras, the less processing resources needed.

Figure 5:
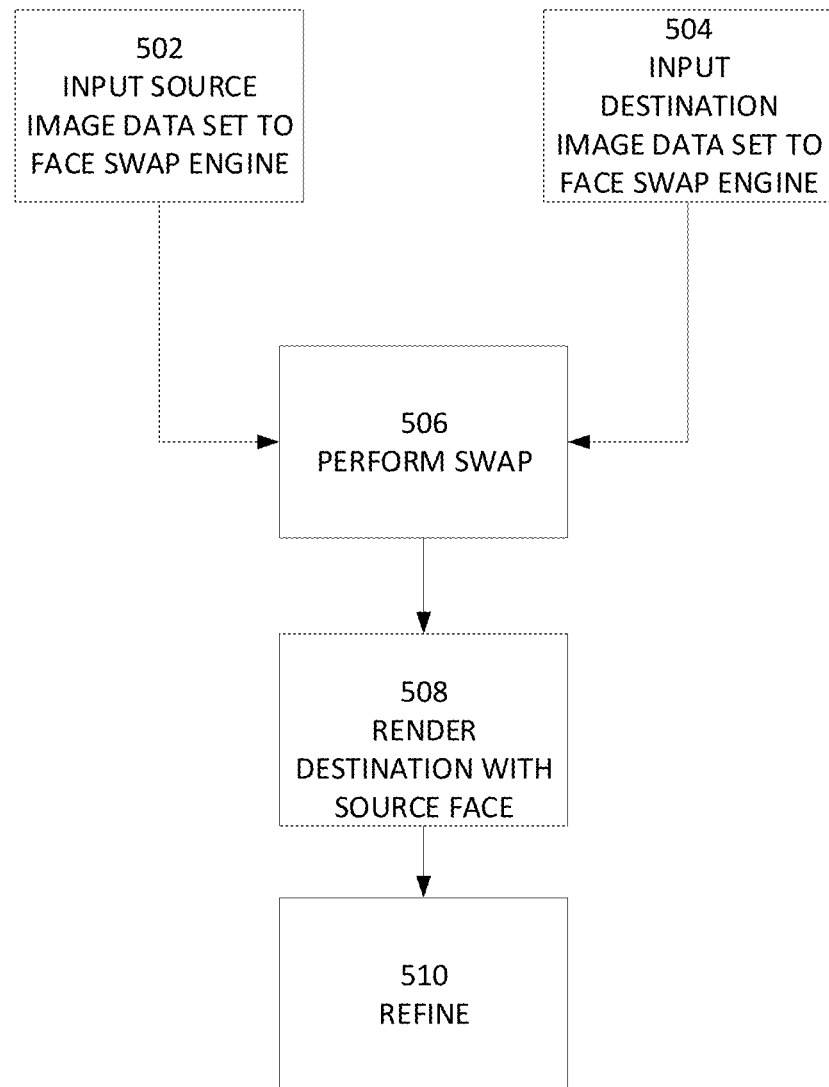
FIG. 5 illustrates an example face swapping process.

FIG. 5 illustrates an example face swapping process. At block 502, the source data set of CGI facial images is provided to the trained artificial intelligence engine (e.g., the trained autoencoder). At block 504, the source data set of CGI facial images is provided to the trained artificial intelligence engine. At block 506, the trained artificial intelligence engine performs the face swap (e.g., by feeding the destination data set facial images to the encoder trained using source and destination facial images and to the decoder trained using the source facial images), where the output has the CGI source face while preserving the expressions of the face in the destination images.

At block 508, the output video sequence images are rendered on a display (the destination image with the destination face replace with the CGI facial image). If the destination images were associated with a speech track recorded of the person in the source images speaking, the output may have the lips and facial expressions of the CGI face synchronized with the speech track so that it appears that the CGI face is speaking the recorded speech track in the same manner as the original face. Advantageously, the source data set and/or the destination data set may be high resolution and the output may be rendered in high resolution (e.g., HD, 4K UHD, 4K, 8K, or 16K).

At block 510, an animator may manually refine the face-swapped image(s). For example, the face-swapping may results in a certain amount of blurriness as a result of pixel loss, particularly with respect to certain features, such as teeth. Image processing tools may be provided to sharpen the image or selected portions thereof. Further, image processing tools may be provided to remove or reduce undesirable shadowing.

Figure 9:
FIG. 9 illustrates example destination and output images generated by an autoencoder.

FIG. 9 illustrates example destination images and the resultant output images with the original face replaced using an autoencoder with a CGI face.

Conventionally, image processing operations, such as artificial intelligence engine training for identifying or swapping faces, or for performing face swapping, are complex for users to navigate. Therefore, conventionally, users may need to be highly skilled and trained. Disclosed herein are user interfaces that greatly simply the users experience in managing such image processing operations, and that reduce the need to navigate through multiple complex and confusing user interfaces.

Figure 6:
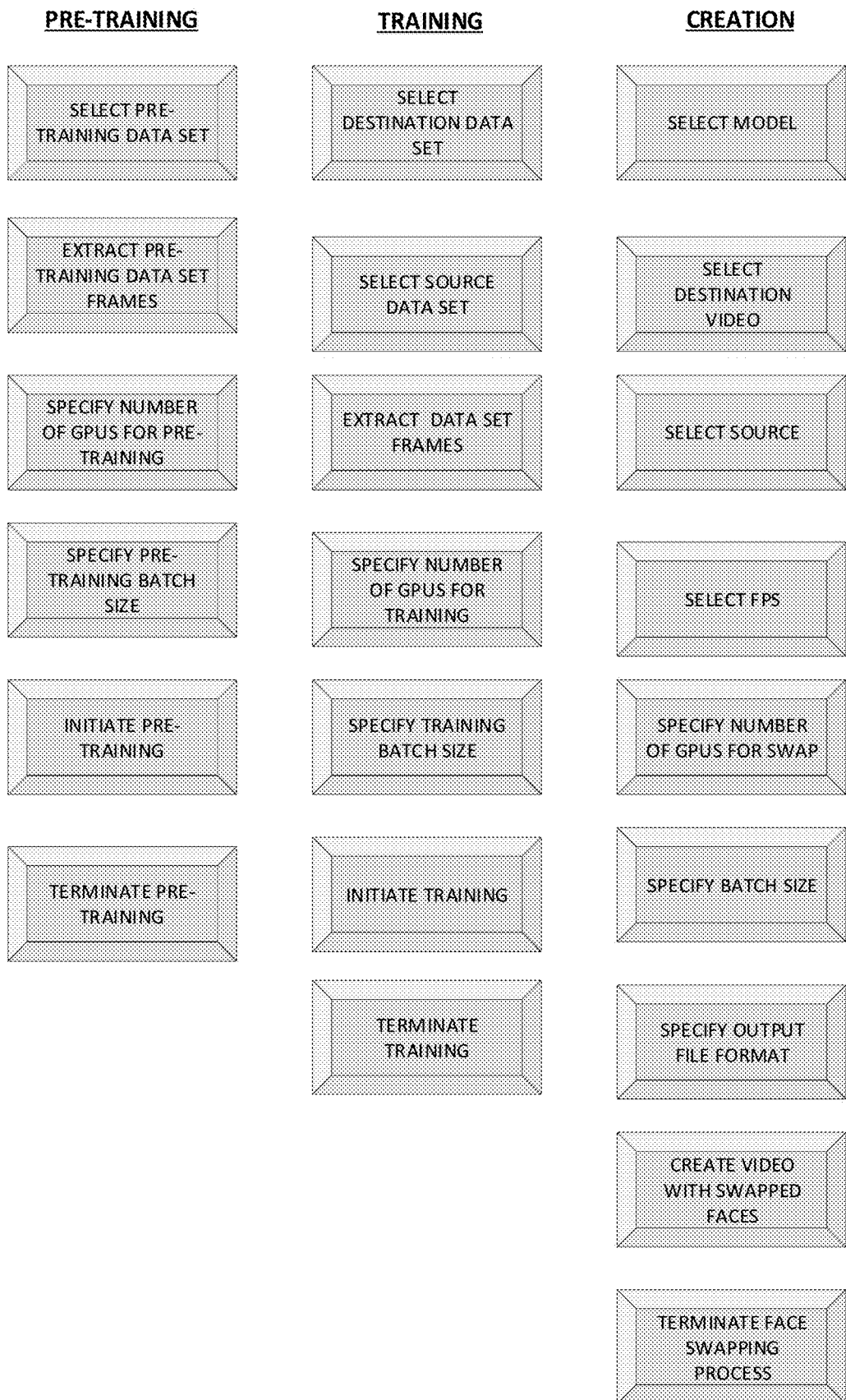
FIGS. 6 and 7 illustrate example user interfaces.

FIG. 6 illustrates such an example user interface. The example user interface includes controls organized in function sets, such as a pre-training set of controls, a training set of controls, and a output video creation set of controls.

The pre-training set of controls includes a select pre-training data set control, when activated, causes a file selection user interface to be presented. The file selection user interface may generate a list of pre-training data sets (e.g., videos or still images) from a pre-training data set data store. A user may select a desired pre-training data set to be used in training.

An extract pre-training control, when activated, causes frames from the selected pre-training data set to be extracted. A perform pre-training control, when activated, causes the extracted frames from the selected pre-training data set to be provided to an artificial intelligence engine (e.g., an autoencoder) for pre-training.

A specify number of GPUs for pre-training control, when activated, causes a user interface to be presented via which the user may enter the number of GPUs in a GPU array that are to be used in performing the pre-training. The user interface may display the number of GPUs available based on a determination as to GPU availability.

A specify pre-training batch size control, when activated, causes a user interface to be presented via which the user may enter the number of extracted pre-training images that are to be used for a given training iteration (e.g., 0-32). For example, a relatively larger batch size result in a learning engine that more accurately identifies and classifies faces and/or facial features (e.g., eyes, nose, mouth), but may need more processing time and/or computing resources.

An initiate pre-training control, when activated, initiates the pre-training process of the artificial intelligence engine (e.g., an autoencoder) as discussed elsewhere herein using the extracted frames from the selected training data set.

A terminate pre-training control, when activated, causes the pre-training process to be manually halted. For example, a user may want to interrupt a pre-training process because it is taking too long or because the real-time results indicate that the current level of pre-training is adequate.

The training set of controls includes a select destination data set control, when activated, causes a file selection user interface to be presented. The file selection user interface may generate a list of destination data sets (e.g., videos) from a destination data set data store. A user may select a desired destination data set to be used in training.

A select source data set control, when activated, causes a file selection user interface to be presented. The file selection user interface may generate a list of source data sets (e.g., videos) from a source data set data store. A user may select a desired source data set to be used in training.

An extract training control, when activated, causes frames from the selected destination and source data sets to be extracted.

A specify number of GPUs for training control, when activated, causes a user interface to be presented via which the user may enter the number of GPUs in a GPU array that are to be used in performing the training. The user interface may display the number of GPUs available based on a determination as to GPU availability.

A specify training batch size control, when activated, causes a user interface to be presented via which the user may enter the number of extracted training images that are to be used for a given training iteration (e.g., 0-32). For example, a relatively larger batch size result in a learning engine that more accurately performs face swapping, but may need more processing time and/or computing resources.

An initiate training control, when activated, initiates the training process of the artificial intelligence engine as discussed elsewhere herein using the extracted frames from the selected destination and source data sets.

A terminate training control, when activated, causes the training process to be manually halted. For example, a user may want to interrupt a training process because it is taking too long or because the real-time results indicate that the current level of training is adequate.

The output video creation set of controls includes a select model control, when activated, causes a model selection user interface to be presented. The model selection user interface may generate a list of models (e.g., trained autoencoders) in a trained model data store. A user may select a desired trained model to be used in performing a face swapping operation. Optionally, a model search field may be provided which enables the user to enter or select search criteria (e.g., a name, tags, creation date, last edit date, etc.). A search engine may then locate models that match the search criteria and generate a search results list that is presented to the user and from which the user can select a desired model. The search may automatically be limited to models, rather than files and data objects in general.

A select destination video control, when activated, causes a file selection user interface to be presented. The file selection user interface may generate a list of destination videos from a destination data set data store. A user may select a desired destination video to be used in performing the face swapping operation.

A select source video control, when activated, causes a file selection user interface to be presented. The file selection user interface may generate a list of source videos from a source data set data store. A user may select a desired source video to be used in performing the face swapping operation.

A select FPS control, when activated, causes a frame per second selection user interface to be presented. For example, the user interface may include a menu of FPS choices (e.g., 24, 30, 60, 120 fps) from which the user may select and/or the user interface may include a field via which the user may manually enter a desired FPS.

A specify number of GPUs for swap control, when activated, causes a user interface to be presented via which the user may enter the number of GPUs in a GPU array that are to be used in performing the face swapping process. The user interface may display the number of GPUs available based on a determination as to GPU availability.

A specify batch size control, when activated, causes a user interface to be presented via which the user may enter the number of source and destination images that are to be used for a given swap iteration (e.g., 0-32).

A specify output file format control, when activated, causes an output file format user interface to be presented. For example, the user interface may include a menu of file choices from which the user may select, such as MPEG, JPEG, etc.

A create video with swapped faces control, when activated, causes the face swapping process, described elsewhere herein, to be performed.

A terminate face swapping process control, when activated, causes the face swapping process to be manually halted. For example, a user may want to interrupt a face swapping process because it is taking too long or because the real-time results indicate that the output is unsatisfactory.

Figure 7:
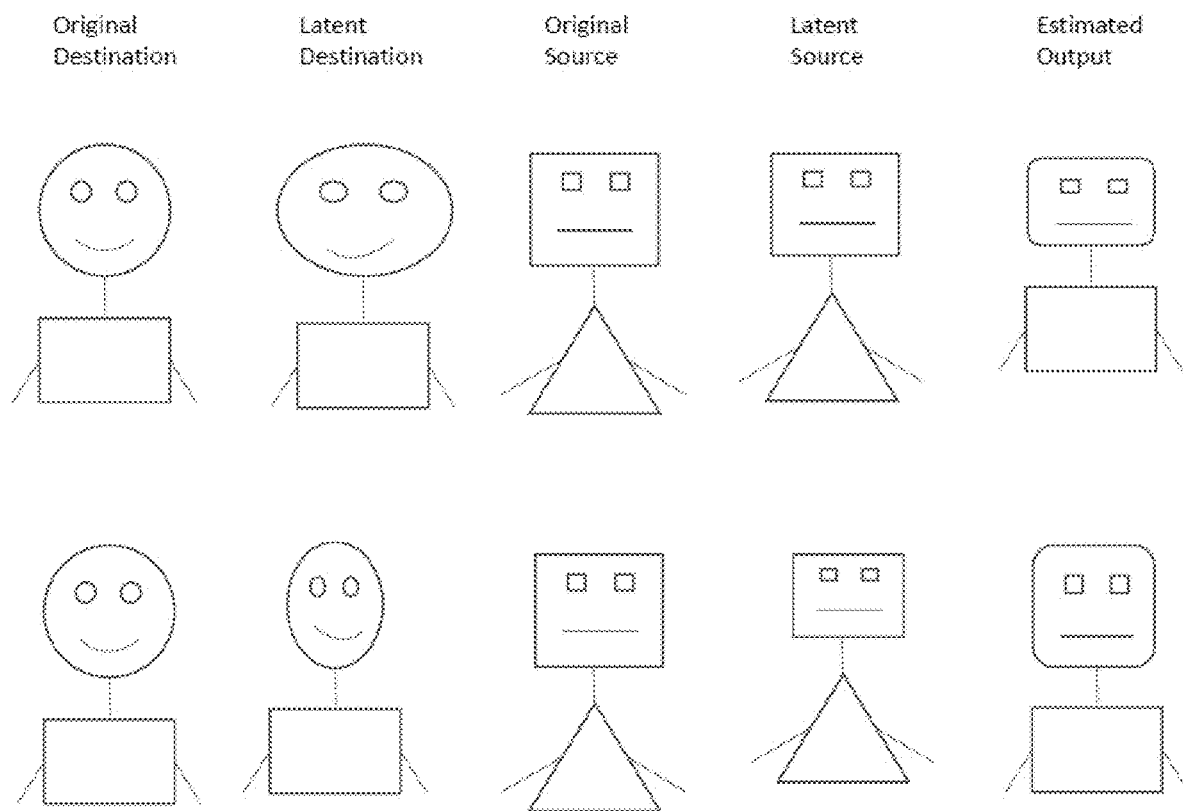

Optionally, during a face swapping process, a user interface may be provided that, in real time, shows at the same time the original destination image, the corresponding latent destination image, the original source image, the latent source image, and/or the estimated output of the face swapping process. FIG. 7 illustrates such an example user interface, including original destination, destination image, original source, latent source, and estimated output columns. Each row may represent another iteration. This interface may enable a user to monitor the training progress and/or performance of an engine, such as an autoencoder, in real time. Based on the monitored progress, a user may elect to terminate a pre-training process, a training process, or a face swapping process.

Thus, systems and methods are described herein that perform face swapping operations in a more computer-resource and time efficient manner, while providing a more realistic and higher resolution output than currently available conventional methods. It is understood that although reference may be made wherein to face swapping for illustrative purposes, the disclosed systems an method may be used to swap other items instead of or in addition to human faces.

The disclosed processes may be performed in whole or in part by a user device, a local system, and/or a cloud-based system. For example, some or all of a given disclosed process may be executed by a secure, cloud based system comprised of co-located and/or geographically distributed server systems. Information may be received by the cloud-based system from one or more terminals. A terminal may include or be connected (via a wireless or wired connection) to one or more sensors, such as one or more microphones, one or more cameras (e.g., front facing and/or rear facing cameras, and/or the like. A terminal may include a display, a wired network interface, a wireless local network interface and/or wireless cellular interface.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications/alerts and user interfaces described herein may be provided via a Web page, a dedicated or non-dedicated phone application, computer application, a short messaging service message (e.g., SMS, MMS, etc.), instant messaging, email, push notification, audibly, a pop-up interface, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. An electronic image processing system, comprising:
a network interface;
at least one computing device;
computer readable memory including instructions operable to be executed by the at least one computing device to perform a set of actions, configuring the at least one computing device:
provide computer graphics animation resources configured to enable a user to generate computer graphic imagery (CGI) faces by:
sculpting at least a face;
adding texture to the face;
animating the face to exhibit a plurality of facial expressions and transitions between facial expressions;
use one or more virtual cameras to capture images of the plurality of facial expressions and transitions between facial expressions from a plurality of different angles;
pre-train an autoencoder using images that include faces, wherein the autoencoder comprises:
an input layer;
an encoder including at least one hidden layer that has fewer nodes than the input layer to thereby constrain recreation of an input image by the encoder, wherein the encoder is configured to output a latent image from a corresponding input image;

a decoder configured to attempt to reconstruct the input image from the latent image;
train the pre-trained autoencoder using source images that include a first CGI face with different facial expressions captured at different angles, and using destination images that include a first real face; and
use the trained autoencoder to generate an output using destination images as an input where the first real face in the destination images is swapped with the first CGI face, while preserving expressions of the first real face.

2. The electronic image processing system as defined in claim 1, further comprising:
an array of graphics processing units; and
a task allocator configured to allocate pre-training tasks, training tasks, and face swapping tasks among the graphics processing units in the array of graphics processing units.

3. The electronic image processing system as defined in claim 1, further comprising:
a spherical camera; and
a microphone.

4. The electronic image processing system as defined in claim 1, wherein the electronic image processing system is configured to extract the destination images from a video, locate the first real face within the destination images, and align the located first real faces.

5. The electronic image processing system as defined in claim 1, wherein the electronic image processing system is configured to provide a user interface comprising a pre-training set of controls, a training set of controls, and an output video creation set of controls, wherein
the pre-training set of controls includes a control enabling selection of a pre-training data set, a control enabling specification of a pre-training batch size, and a control initiating pre-training of the autoencoder;
the training set of controls includes a control enabling selection of a destination data set, a control enabling specification of a source data set, a control enabling specification of a training batch size and a control initiating training of the autoencoder; and
the output video creation set of controls a model selection control enabling selection of a trained autoencoder, a control enabling a destination data set to be selected, a control enabling a source data set to be selected, a control enabling an output file format to be specified, and control initiating creation of an output video.

6. The electronic image processing system as defined in claim 1, wherein the electronic image processing system is configured to provide a user interface comprising:
an original destination facial image column and a corresponding latent destination facial image column configured to display corresponding facial images generated by the autoencoder encoder,
an original source facial image column and a corresponding latent source facial image column configured to display corresponding facial images generated by the autoencoder encoder,
an output facial image column configured to display a face-swapped image from the autoencoder.

7. The electronic image processing system as defined in claim 1, wherein the trained autoencoder is configured to generate an output having a HD, 4K UHD, 4K, 8K, or 16K resolution.

8. A system, comprising:
a network interface;
at least one computing device;
computer readable memory including instructions operable to be executed by the at least one computing device to perform a set of actions, configuring the at least one computing device:
access a source data set comprising an image sequence of a first computer graphic imagery (CGI) sculpted and textured face exhibiting a plurality of facial expressions and transitions between facial expressions;
capture images of the plurality of facial expressions and transitions between facial expressions from a plurality of different angles;
train an autoencoder using:
source images that include the first CGI face with different facial expressions captured at different angles, and
destination images that include a first real face,
wherein the autoencoder comprises:
an input layer;
an encoder including at least one hidden layer that has fewer nodes than the input layer to thereby constrain recreation of an input image by the encoder, wherein the encoder is configured to output a latent image from a corresponding input image;
a decoder configured to attempt to reconstruct the input image from the latent image; and
use the trained autoencoder to generate an output where the first real face in the destination images is swapped with the first CGI face, while preserving expressions of the first real face.

9. The system as defined in claim 8, with the training of the autoencoder comprises:
training the encoder using both the source images and the destination images and training the decoder using the source images.

10. The system as defined in claim 8, further comprising:
an array of graphics processing units; and
a task allocator configured to allocate training tasks and face swapping tasks among the graphics processing units in the array of graphics processing units.

11. The system as defined in claim 8, further comprising:
a spherical camera; and
a microphone.

12. The system as defined in claim 8, wherein the system is configured to extract the destination images from a video, locate the first real face within the destination images, and align the located first real faces.

13. The system as defined in claim 8, wherein the system is configured to provide a user interface comprising a training set of controls and an output video creation set of controls, wherein
the training set of controls includes a control enabling selection of a destination data set, a control enabling specification of a source data set, a control enabling specification of a training batch size and a control initiating training of the autoencoder; and
the output video creation set of controls a model selection control enabling selection of a trained autoencoder, a control enabling a destination data set to be selected, a control enabling a source data set to be selected, a control enabling an output file format to be specified, and control initiating creation of an output video.

14. The system as defined in claim 8, wherein the system is configured to provide a user interface comprising:
an original destination facial image column and a corresponding latent destination facial image column configured to display corresponding facial images generated by the autoencoder encoder, an original source facial image column and a corresponding latent source facial image column configured to display corresponding facial images generated by the autoencoder encoder, an output facial image column configured to display a face-swapped image from the autoencoder.

15. The system as defined in claim 8, wherein the trained autoencoder is configured to generate an output having a HD, 4K UHD, 4K, 8K, or 16K resolution.

16. The system as defined in claim 8, wherein the system is configured to:

pre-train the autoencoder using a plurality of images of a plurality of faces prior to training the autoencoder.

17. A computer-implemented method comprising:

under control of a hardware computing device configured with specific computer-executable instructions:

accessing a source data set comprising an image sequence of a first computer graphic imagery (CGI) sculpted and textured face exhibiting a plurality of facial expressions and transitions between facial expressions;

capturing images of the plurality of facial expressions and transitions between facial expressions of the first CGI face from a plurality of different angles;

training an autoencoder using:

source images that include the first CGI face with different facial expressions captured at different angles, and destination images that include a first real face, wherein the autoencoder comprises:

an input layer;

an encoder including at least one hidden layer that has fewer nodes than the input layer, wherein the encoder is configured to output a latent image from a corresponding input image;

a decoder configured to attempt to reconstruct the input image from the latent image; and using the trained autoencoder to generate an output using the destination images, where the first real face in the destination images is swapped with the first CGI face, while preserving expressions of the first real face.

18. The computer-implemented method as defined in claim 17, wherein training the autoencoder further comprises:

training the encoder using both the source images and the destination images and training the decoder using the source images.

19. The computer-implemented method as defined in claim 17, the method further comprising:

allocating training tasks and face swapping tasks among graphics processing units in an array of graphics processing units.

20. The computer-implemented method as defined in claim 17, further comprising:

enabling a voice track associated with the destination data set to be synchronized with the first CGI face in the output using the preserved expressions of the first real face.

21. The computer-implemented method as defined in claim 17, the method further comprising:

extracting the destination images from a video;

locating the first real face within the destination images; and aligning the located first real faces.

22. The computer-implemented method as defined in claim 17, the method further comprising:

providing a user interface comprising a training set of controls and an output video creation set of controls, wherein the training set of controls includes a control enabling selection of a destination data set, a control enabling specification of a source data set, a control enabling specification of a training batch size and a control initiating training of the autoencoder; and the output video creation set of controls a model selection control enabling selection of a trained autoencoder, a control enabling a destination data set to be selected, a control enabling a source data set to be selected, a control enabling an output file format to be specified, and control initiating creation of an output video.

23. The computer-implemented method as defined in claim 17, the method further comprising:

providing a user interface comprising:

an original destination facial image column and a corresponding latent destination facial image column configured to display corresponding facial images generated by the autoencoder encoder, an original source facial image column and a corresponding latent source facial image column configured to display corresponding facial images generated by the autoencoder encoder, an output facial image column configured to display a face-swapped image from the autoencoder.

24. The computer-implemented method as defined in claim 17, wherein the output has a HD, 4K UHD, 4K, 8K, or 16K resolution.

25. The computer-implemented method as defined in claim 17, the method further comprising:

pre-training the autoencoder using a plurality of images of a plurality of faces prior to training the autoencoder.

* * * * *